April 16, 1963 D. P. OWENS 3,085,342
MITER TOOL FOR A STRAIGHT BACK HAND SAW
Filed Jan. 4, 1960
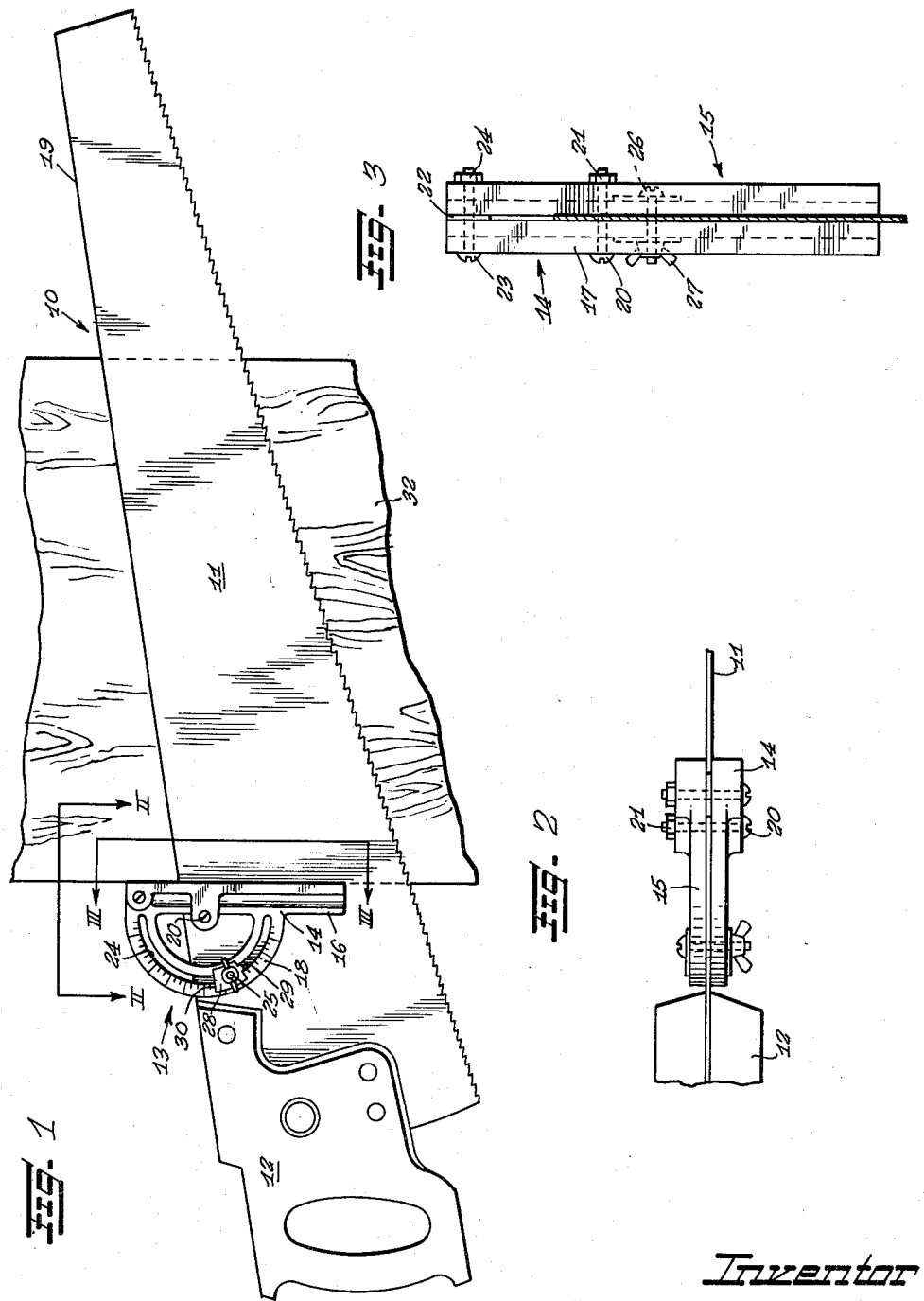
Inventor
David P. Owens 3,085,342
MITER TOOL FOR A STRAIGHT BACK HAND SAW
David P. Owens, R.D. 2, Finleyville, Pa.
Filed Jan. 4, 1960, Ser. No. 425
1 Claim. (Cl. 33—75)

This invention relates to a saw attachment and more particularly to an attachment which, in combination with the straight longitudinal edge of a straight-back hand saw constitutes a miter square.

In general, miter squares comprise tools having a pair of legs set at, or adjustable to, angles with respect to one another which are used to mark out angles on building materials for the sawing of miter joints.

It has been recognized for some time that it would be advantageous to provide a saw attachment which would utilize the straight longitudinal edge of a straight-back hand saw for one of the legs of the miter square, thus eliminating the necessity for a separate miter square tool. Several such saw attachments have been devised but, with few exceptions, the attachments have been so formed that pivotal movement of the saw handle relative to the saw blade was necessitated. In such structures a great deal of saw rigidity is sacrificed for the provision of an accessory tool.

In other instances the miter tool attachment has been mounted on the saw separately from the saw handle but has been so mounted as to permit only a relatively small degree of pivotal movement. Still further, saw attachments have been devised which were mountable on the saw blade separately from the saw handle but which were formed of such configuration, and had their degree of pivotal movement limited to such an extent that they interferred with a normal sawing operation. Also, some prior types of saws have been formed with an arcuate aperture in the blade itself to facilitate rotation of the miter square attachment and this aperture within the saw blade tends to weaken the blade.

Another disadvantageous feature of many prior types of miter tool attachments for hand saws is that such attachments have generally been provided so that the miter tool attachment was mounted on only one side of the saw blade. Such mounting of the miter tool obviously limited the use of the combination hand saw and miter tool as a miter square.

I have devised a saw attachment which, in cooperation with a straight-back hand saw, serves as an adjustable miter square and which obviates each of the above mentioned disadvantageous characteristics of prior types of miter tool saw attachments.

The miter tool attachment which I have devised is adapted to be pivotally mounted on the saw blade itself independently of the saw handle and has a work piece abutment face disposed on each side of the saw blade so that its usage will not be unduly restricted.

The tool is spaced a sufficient distance from the saw handle to permit movement of the tool through a large arc, thus permitting a great many more adjustment positions than has generally heretofore been possible.

An adjustment screw extends through an arcuate slot in the miter tool on one side of the saw blade, through an aperture in the saw blade, and through another arcuate aperture in the opposite half of the miter tool and is provided with means for tightening up the miter tool against the saw blade to keep the tool in a locked position with respect thereto.

Since no arcuate apertures or, special attachment means, or the like need be provided in the hand saw and since the attachment is a self-contained unit needing only to be attached to the blade of a normal hand saw, any straight-back hand saw may be fashioned to accept such a tool merely by drilling a pair of holes through the saw blade; one to accept the pivot pin for the miter tool, and one to accept the adjustment screw.

It is therefore a principal object of the present invention to provide a simple miter tool attachment which may be readily attached to an ordinary straight-back hand saw to provide, in combination with the straight edge of the saw, a miter square.

Another object of the invention resides in the provision of a miter square attachment for a straight-back hand saw which is movable through a relatively large arc.

Yet another object of the invention resides in the provision of a miter tool attachment of the type generally described above which has work piece abutment faces disposed on each side of the saw blade.

A still further object of the invention is the provision of a straight-back hand saw having a miter tool attachment rotatably mounted thereon, in which positioning of the miter square attachment may be effected without moving the saw handle and in which such movement is provided for without materially weakening the saw blade.

These and other objects of the invention will appear from time to time as the following specification proceeds and with reference to the accompanying drawings, wherein:

FIGURE 1 is a side elevational view of a straight-back hand saw having a miter tool constructed in accordance with the principles of the present invention mounted thereon;

FIGURE 2 is a plan view taken in the direction of lines II—II of FIGURE 1 showing the miter tool attachment in full plan and fragmentarily illustrating the straight-back hand saw; and FIGURE 3 is a front elevational view of the miter tool attachment showing a portion of the saw blade in vertical section, which is taken along lines III—III of FIGURE 1.

As illustrated in FIGURE 1 a straight-back hand saw 10, having a saw blade 11 and a handle 12 attached thereto, has a miter tool attachment 13 mounted on the saw blade 11 thereof.

The miter tool attachment 13 comprises a pair of identical members 14 and 15. Each half of the miter tool attachment comprises an elongated guide member 16 and an adjusting band 18. The member 16 has an outwardly extending flange 17 formed integrally therewith which has a flat face 16a serving as a guide for engaging work pieces. The semi-circular adjusting band 18 is formed integrally with the guide member 16 and has a flat rear face which lies in a plane perpendicular to the plane of the flat face 16a of the flange 17. The flat rear face of each of the members 14 and 15 are adapted to slidably seat against opposite faces of the saw blade 11.

The members 14 and 15 are mounted for pivotal movement on the saw blade 11 adjacent the straight edge portion 19 thereof by means of a pivot pin 20 which extends through each of the members and through an aperture in the saw blade 11 and which is maintained in proper position by means of lock nuts 21 or the like. The members 14 and 15 have a spacer 22 disposed between the flat rear faces thereof at the upper ends thereof as viewed in FIGURE 1 and are bolted together for co-rotatable movement with one another by means of a bolt 23 and cooperating nut 24.

It will be understood that where the saw operator finds it desirable to permit the miter tool attachment to move through arcs approximating 180° or greater, that the spacer 22 and bolt 23 may be removed so that each of the sections 14 and 15 has relative freedom of movement with respect to the other member. When the spacer 22 is interposed between the members and the bolt 23 serves to corotatably interconnect the members 14 and 15, the degree of pivotal movement permitted of the attachment 13 is limited to some degree; the extent of the degree of pivotal movement permitted when the bolt 23 is utilized being also dependent upon the proximity which the pivot pin 20 bears to the straight-edge 19 of the saw blade 11.

An arcuate aperture is cut within the semicircular band 18 which is struck from the pivotal axis of the miter tool attachment 13. An adjustment pin 25 extends through an aperture formed in the saw blade 11 and is slidably received within the arcuate aperture 24 in each of the members 14 and 15. The adjustment pin 25 has a head 26 formed on one end thereof and a wing-nut 27 threadedly mounted on the opposite end thereof.

Adjustment plates 28 are mounted on the pin 25 and are slidably disposed on the outer face of each of the members 14 and 15. The plates 28 have depending fingers 29 formed thereon which are disposed within the arcuate apertures 24 to maintain the plates in a fixed position irrespective of rotatable movement of the miter tool attachment 13. The plates 28 each have a straight edge 30 which is maintained by this means in parallel relation with respect to the straight edge 19 of the saw blade 11. Further, the straight edge 30 is so positioned with respect to the pivotal axis of the miter tool attachment 13, that a line drawn across the straight edge 30 will intersect the pivotal axis of the tool 13 and so that this line will be parallel with the straight edge 19.

The semi-circular band 18 of each of the members 14 and 15 has a plurality of degree markings scribed thereon so that when the 90° mark is aligned with the straight edge 30 of either of the plates 28, the flat face 16a of the flange 17 will be disposed at an angle of 90° with respect to the straight edge 19 of the saw blade 11. When the miter tool attachment 13 has been moved to the desired position with respect to the straight edge 19 of the blade 11, the wing-nut 27 may then be tightened down to maintain the miter tool in the desired adjusted position. The saw blade 11 may then be laid against the surface of a plank, such as the wooden plank 32, with the flat face 16a abutting one edge of the plank. A line may then be drawn on the plank along the straight edge 19 of the saw blade 11.

I have thus provided a miter tool attachment for an ordinary straight-back hand saw which may be mounted thereon merely by drilling two spaced apertures in the saw blade thereof and which is of extremely simple design, yet obviating many of the disadvantageous features heretofore mention characteristic of prior types of miter tool attachments.

It will be understood that this embodiment of the invention has been used for illustrative purposes only and that various modifications and variations in the present invention may be effected without departing from the spirit and scope of the novel concepts thereof.

I claim as my invention:

In a hand saw having a handle and a blade with a straight back, the improvement of means for adapting the saw for use as a miter tool comprising: a pair of flat-faced members rotatably mounted on the saw blade about the same axis adjacent the handle thereof with their flat faces disposed in planes perpendicular to the plane of the saw blade, flattened side faces formed on said flat-faced members, arcuate apertures formed within said members and struck from the pivotal axis thereof, a pin extending from each side of the saw blade slidably received within said apertures, degree indicia scribed on at least one of said members adjacent said aperture, an adjusting plate mounted on said pin and overlying and abutting the portion of said member having degree indicia scribed thereon for indicating the relative rotated position of said member relative to the straight edge of the saw blade, said plate having a depending finger thereon extending into the arcuate aperture, wherein a line drawn through the pivotal axis of said members and a portion of said plate indicating the relative rotated position of said members lies in a plane parallel to the straight edge of the saw blade, and flat-faced means threadedly mounted on said pin and cooperable with said flattened side faces for pressing said members against the saw blade to maintain said members in a fixed position relative thereto, wherein the straight back of the saw and said flat-faced members cooperate to define two legs of a miter tool.

References Cited in the file of this patent

UNITED STATES PATENTS

| | | |
|---|---|---|
| 953,863 | Shaw | Apr. 5, 1910 |
| 1,136,790 | Funk | Apr. 20, 1915 |
| 1,137,838 | Cline | May 4, 1915 |
| 1,304,501 | Menin et al. | May 20, 1919 |
| 1,492,705 | Dulczewski | May 6, 1924 |
| 1,674,834 | Mitchell | June 26, 1928 |
| 2,755,556 | Lindenbein | July 24, 1956 |